United States Patent [19]

Bouman

[11] 4,010,505
[45] Mar. 8, 1977

[54] DOCKBOARDS

[75] Inventor: Willem J. Bouman, Toronto, Canada

[73] Assignee: Richards-Wilcox of Canada Limited, London, Canada

[22] Filed: Sept. 11, 1975

[21] Appl. No.: 612,558

[52] U.S. Cl. .................................................. 14/71.3
[51] Int. Cl.² ........................................... E01D 1/00
[58] Field of Search .......................... 14/71 M, 71 R

[56] References Cited

UNITED STATES PATENTS

| | | | |
|---|---|---|---|
| 3,323,158 | 6/1967 | Loomis | 14/71 M |
| 3,475,778 | 11/1969 | Merrick | 14/71 M |
| 3,584,324 | 6/1971 | Merrick | 14/71 M |
| 3,662,416 | 5/1972 | Brooks | 14/71 M |

*Primary Examiner*—Nile C. Byers, Jr.
*Attorney, Agent, or Firm*—Hirons & Rogers

[57] ABSTRACT

A new dockboard is provided of the kind having a ramp assembly mounted by frame means, the ramp assembly being constituted by a lip plate pivotally connected to the front edge of a main plate, which has its rear edge pivotally connected to the dockboard frame means. The ramp assembly is moved upward by springs, such upward movement being restrained under the control of an operator by a ratchet device. Means for elevating the lip plate relative to the main plate comprise an arm pivoted to the underside of the lip plate and controlled in its movement by guidance means mounted on the frame means. The arm carries one latch member which cooperates with another latch member movably mounted by the frame means, preferably by means of a pendulous support member.

13 Claims, 9 Drawing Figures

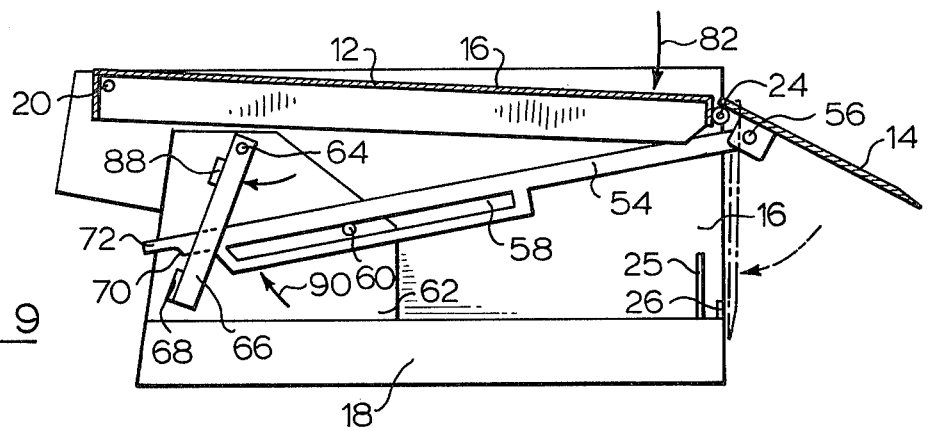

DOCKBOARDS

FIELD OF THE INVENTION

This invention is concerned with improvements in dockboards of the kind comprising a ramp assembly pivotally mounted to frame means, the ramp assembly comprising a main plate pivoted at its rear edge to the frame means and a lip plate pivoted at its rear edge to the front edge of the main plate, the lip plate being movable about its pivot between a stored pendent position and an extended position in which it forms an extension of the main plate.

REVIEW OF THE PRIOR ART

The desired operating characteristics for a dockboard of this kind are now well-established in this industry. The ramp assembly rests when not in use securely in a stored position in which the main plate is horizontal. If the board is inset in a dock then the main plate is flush with the top surface of the dock so that traffic can pass freely and safely thereover. As a truck approaches the dock the ramp assembly is lifted with little or no effort above the level of the truck rear platform, and is then readily lowered down on to the truck platform with the lip in elevated position. The ramp assembly should be free to move up or down as the truck is unloaded or loaded respectively without the lip plate disengaging from the truck platform. When the truck drives away the lip plate should immediately drop automatically to its pendent position and any weight applied to the main plate should immediately move it to the stored horizontal position without the possibility of falling below that position A number of such dockboards have been proposed hitherto, employing various different arrangements for automatically moving the lip plate from the stored to the extended position as the main plate is moved about its pivot.

For example, in the construction disclosed in U.S. Pat. Specification Ser. No: 3,137,017 the main plate is held by a releasable latch in the stored position against the urge of powerful upwardly-acting springs, and lip-lifting means include a flexible connection between the frame means and the lip plate. Upon release of the latch the main plate moves upward and at some point in the upward movement the flexible connection becomes taut, and further movement is accompanied by elevating pivoting movement of the lip plate. A spring-operated latch is provided to hold the lip plate in the elevated position until it comes to rest upon the back of the truck.

In the construction illustrated in U.S. Pat. No: 3,475,778 the elevation of the lip plate is accomplished during downward movement of the main plate. Upward movement of the main plate extends a telescoping arm connected at one end to the lip plate and at the other end to the frame means. The arm is then latched in the extended condition while the main plate moves downward, causing the required elevation of the lip plate.

It is inherent in the marketing and price structure of dockboards that they cannot be manufactured to extremely close tolerances. In practical use they are often subjected to heavy abuse, and are expected to remain in good operating state under all weather conditions, frequently with little or no adequate regular maintenance. It will be apparent therefore that the provision of suitable lip elevating mechanisms that are of low cost, rugged and reliable over extended periods of time has proven difficult in commercial practice.

Field of the Invention

It is an object of the invention to provide a dockboard of the kind specified having a new automatic lip plate extending mechanism.

It is a more specific object to provide a new dockboard of the kind specified having a new lip plate extending and latching mechanism of relatively simple form.

In accordance with the present invention there is provided a dockboard comprising frame means; a main plate having a front edge; means pivotally connecting the main plate with the said frame means for pivoting movement about a respective first pivot axis; a lip plate; means mounting the lip plate at the main plate front edge for movement relative to the main plate between a stored position and an operative extended position; and lip-extending means operative to move the lip plate from its stored position to its operative position upon downward movement of the main plate about the said first pivot axis; the same lip-extending means comprising:

an arm operatively connected with the said lip plate and movable therewith;

guide means mounted to the frame means engaging the arm and guiding it for longitudinal movement and also permitting pivoting movement of the arm relative to the frame means;

and latch means comprising cooperating latch members on respectively the arm and the frame means and engagable with one another upon movement of the main plate to an upper position so that downward movement of the main plate from the upper position will cause the arm to extend the lip plate;

the said frame means latch member being movably mounted on the frame means for movement such as to maintain operative engagement of the latch during the downward movement of the main plate from said upper position, and to permit disengagement of the latch at a lower position above where the extended lip-plate can engage a truck in front of the dockboard.

Preferably, the said arm latch member is provided on the arm on the side thereof with respect to the said guide means pivot opposite to the connection of the arm with the lip plate.

The said frame means latch member may be mounted for pendulous movement and engages the arm latch member over an arc of its pendulous movement.

DESCRIPTION OF THE DRAWINGS

A dockboard which is a particular preferred embodiment of the invention will now be described, by way of example, with reference to the accompanying diagrammatic drawings, wherein:

FIGS. 6 to 9 are plane sections similar to FIG. 5, showing a cycle of the operation of the lip-plate elevating and latching mechanism.

DESCRIPTION OF THE PREFERRED EMBODIMENT

Figure 1:
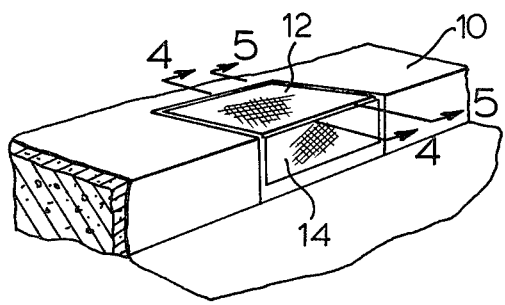
FIG. 1 is a general perspective view showing the dockboard installed in a loading dock or platform and with the ramp assembly in the stored pendant position.
Figure 4:
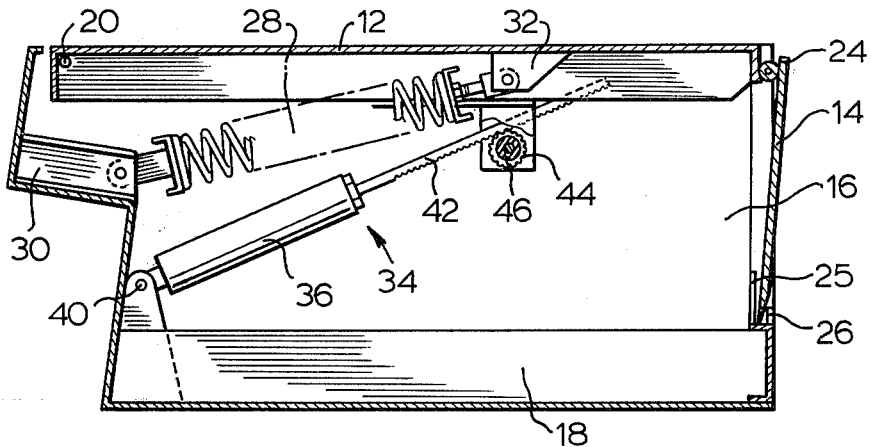
Figure 5:
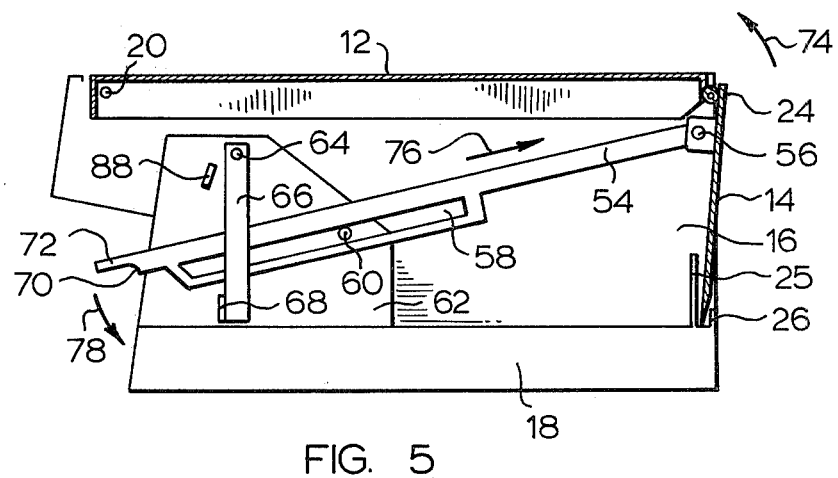

The particular form of dockboard illustrated herein is intended to be mounted as an integral unit into a recess in a loading dock or platform 10 so that, with the ramp assembly in the stored position shown in FIGS. 1, 4 and 5 the main plate 12 thereof is approximately level with the top surface of the dock, and the lip plate 14 is folded down to be approximately flush with the front face of the dock. It will be understood that the term "stored" position is used for convenience and under some conditions the dockboard will be operative for loading and unloading while in this position. The invention also is applicable to other forms of dockboard, such as a free-standing unit without a surrounding dock, and a unit of the type especially adapted for use with a "stepdown" dock. The term "frame means" is used herein for convenience in terminology, and in the embodiment illustrated comprises a box-like frame assembly 16; in other embodiments the frame means may instead comprise, for example, only the means by which the ramp assembly and its associated mechanism are fastened to a suitable supporting structure, which may be the dock, in which case the said supporting structure operatively connects the fastening means together.

Figure 3:
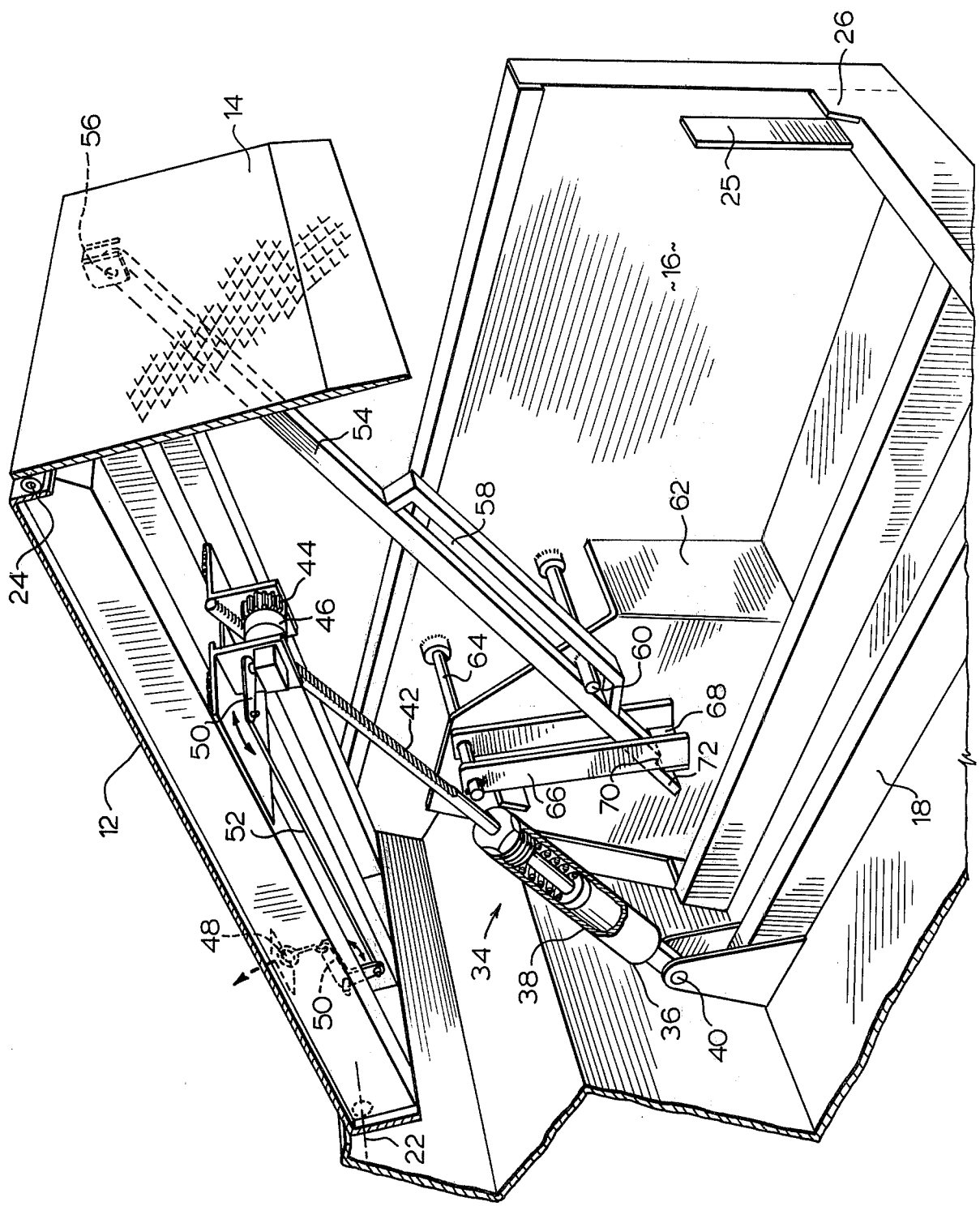
FIG. 3 is a general perspective view, with the nearer part of the dockboard cut away for ease of illustration, of the underside of the ramp assembly, showing the new lip-plate elevating and latching mechanism and the ratchet hold-down device, FIG. 4 (sheet 1) is plane section taken on the line 4—4 of FIG. 1 showing the board spring counterbalance and restraining device, FIG. 5 (sheet 1) is a plane section taken on the line 5—5 of FIG. 1, showing in outline the position of the lip-plate elevating and latching mechanism while the ramp assembly is in its stored position.

This particular dockboard comprises a frame assembly 16 of welded sheet metal, made sufficiently rigid for transport, installation and subsequent use in known manner, as by suitable strengthening edges and cross bracing members such as 18; with this embodiment the frame assembly when installed is supported by the surrounding concrete of the dock 10. The main plate 12 has its rear edge pivoted to the frame assembly by a pivot 20, the axis 22 (FIG. 3) of the pivot being horizontal. The pivot 20 is arranged to permit use of the dockboard when the platform of the truck in front of the dockboard is tilted sideways e.g. owing to a collapsed spring or tire; constructions necessary for this purpose are known to those in the art and do not require illustration herein for a full description of the invention. The lip plate 14 is hinged to the front edge of the main plate by a pivot pin 24 having its axis parallel to that of the pivot 20. Referring especially to FIGS. 1, 4 and 5, in the stored position illustrated, the main plate 12 is horizontal and the lip plate 14 is generally vertical, in what is sometimes called its pendant or stored position, with its front edge engaged between spaced pairs of stop members 25 and 26.

Spring means comprising one or more heavy helical compression springs 28 (FIG. 4) are pivotally connected at one end to a member 30 fixed to the frame 16 and at the other end to a bracket 32 fixed to the underside of the main plate. Two extreme positions of this particular ramp assembly are shown respectively in FIGS. 6 and 9, and in all positions of the ramp assembly, whether the lip plate is in the said extended or in the same pendant position, the bias of the spring or springs is sufficient to overcome the effective weight of the assembly. However, the upward urge of the spring or springs 28 can be completely overcome by the weight of an operator walking out onto the main plate 12 from the dock.

The upward movement of the ramp assembly is controlled by the operator in known manner by means of a ratchet restraining device 34, (FIGS. 3 and 4) connected between the main plate and the frame means. In this particular embodiment a cylinder 36 containing a compression spring 38 is pivoted at 40 to the frame means. The spring 38 is interposed between the upper end of the cylinder 36 and the lower end of an axially-movable, elongated rack member 42, so as to urge the member 42 downwards into the cylinder. The rack member is engaged with a pinion 44 on a ratchet device 46, the operation of the device 46 being controlled by use of an operator's grip ring 48, via levers 50 and connecting rod 52. Thus, the ratchet device 46 holds the pinion 44 against rotation that will permit elevation of the ramp assembly by the springs 28, until the ring 48 is pulled by the operator, while permitting free movement downwards of the ramp assembly, e.g. under the weight of the operator as described.

Figure 2:
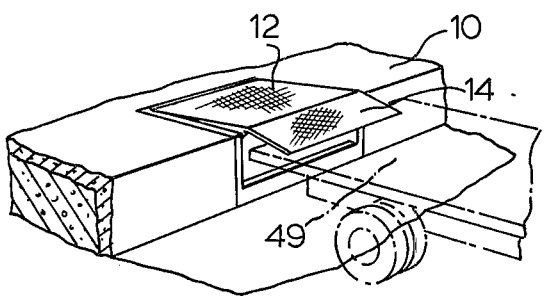
FIG. 2 is a view similar to FIG. 1 and showing the ramp assembly in a typical operative position with the lip plate resting upon a truck platform.

The spring 38 operates in known manner when the lip plate is resting on the rear platform of a truck 49 (see FIG. 2) to permit upward movement of the ramp assembly as the truck platform rises, consequent upon the removal of weight therefrom as the truck is unloaded; in the absence of such a spring the force applied to the ratchet device 46 by the heavy truck springs could be sufficient to break it.

The lip-plate-extending mechanism of this invention consists of an arm member 54 the front end of which is pivotally connected via pivot pin 56 to the underside of the lip plate, the arm being guided and latched in its lip-plate extending motion by guiding and latching means. In this embodiment the guide means are constituted by a longitudinal slot 58, extending over a portion of the length of the arm, the slot closely but freely embracing the cantilevered end of a horizontal pin 60, the pin being fastened to one side wall of the frame means and extending through a support bracket 62 also fixed to the frame means. It will be seen that the arm is guided and constrained in its movement by the slot 58 and the pin 60, being capable of longitudinal movement when the slotted arm can slide freely longitudinally over the pin. Any movement of the end of the arm connected to the lip plate other than longitudinal will rotate the arm about the pin 60 as a pivot, causing a corresponding opposite non-longitudinal movement of the arm rear end. Another pin 64 is mounted by the frame means and bracket 62 to be parallel to the pin 60 and carries at its cantilevered outer end a freely-pivoted pendulous latch assembly 66, which in this embodiment is constituted by two parallel arms and a bridging latch member 68. The rear end of the arm 54 constitutes a cooperating latch member, being provided with a latch face 70. A rearward extension 72 of the arm cooperates with the latch member 68 as described below.

The operation of the lip-extending mechanism can now be described. With the ramp assembly in the stored position shown in FIGS. 1, 4 and 5 the arm 54 is resting on the pin 60 and the latch face 70 is to the rear of and above the cooperating latch face of the latch member 68. Upon release of the restraining device 34 the ramp assembly moves upward (arrow 74 in FIGS. 5 and 6) forcing the arm 54 to move forward (arrow 76) and the extension 72 to move both forward and downward (arrow 78). At some point in the upward movement of the ramp assembly, before it reaches the extreme uppermost position shown in FIG. 6, the part of the arm 54 just forward of the latch surface 70 engages the latch member 68 and rotates the pendulous member 66 forwards (arrow 80 in FIG. 6). As the upward movement of the ramp assembly is continued the latch member 68 moves rearwards along the arm until eventually the member is presented to the latch face 70, and any downward movement of the assembly will cause their engagement.

Figure 6:
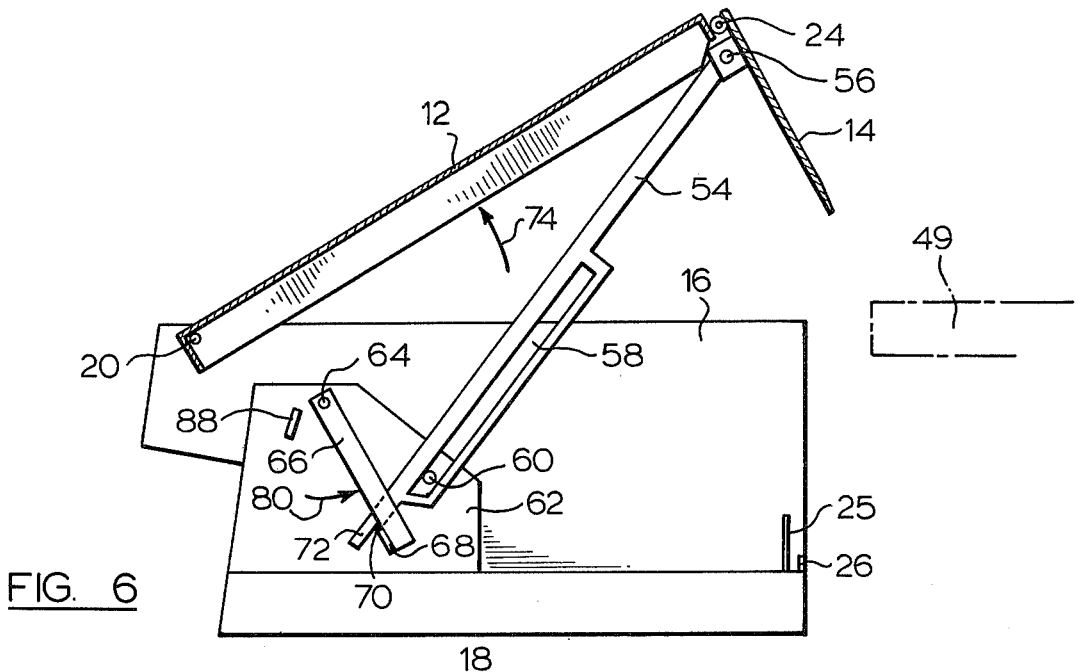
Figure 7:
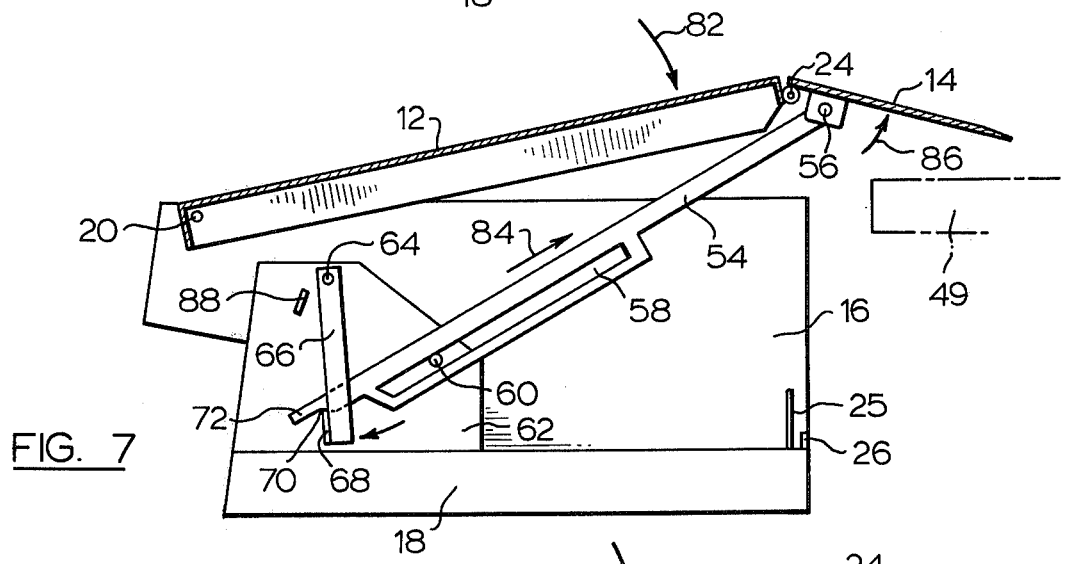
Figure 8:
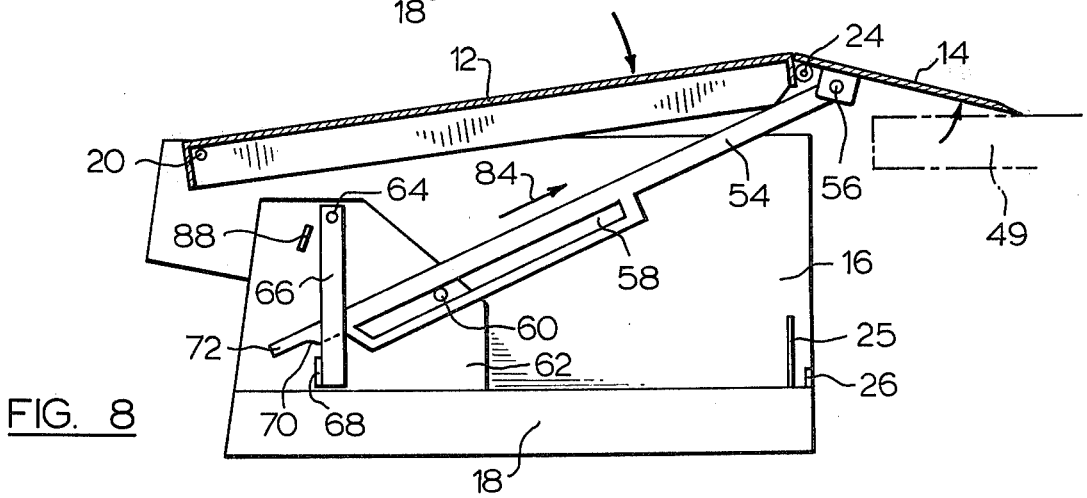

From the extreme uppermost position of FIG. 6 the ramp assembly is moved downward (arrow 82 in FIG. 7), e.g. by the weight of the operator on the main plate 12. Because the latch member 68 and latch face 70 are engaged, and such engagment is firmly maintained by the downwardly-acting weight of the lip plate, the downward force on the assembly applied to the main plate causes a reaction force along the length of the arm 54 (arrow 84 in FIG. 7) which will swing the lip plate about the pivot 24 toward the extended position (arrow 86).

If there is no truck platform 49 present in front of the dockboard then the latch will remain in engagement as the member 66 swings backward on its pivot pin 64, and, if the member 66 were completely free to swing rearwardly, then the engagement between the latch members would become more positive as the member 66 moves further past bottom dead centre. A stop member 88 is therefore provided to the rear of the latch member 66 and is engaged thereby as the main plate reaches its designed lower-most position (as illustrated by FIG. 9). The latch member 68 cannot rise any further, but the latch face 70 is moved upward as it moves rearward and upward, under the action of the pin 60, about which the arm 54 is now pivoting as well as moving rearwardly. Once the latch member 68 and latch face 70 have disengaged the pendulous member 66 will return to its vertical position as in FIG. 5 and the latch cannot re-engage until the ramp assembly is again raised to the necessary upper position just before the uppermost position.

If, as is usually the case, a truck 49 is present in front of the dockboard, then the lip plate will engage it, which will relieve the weight of the lip plate from the arm 54, and will also move the arm longitudinally (arrow 84). The pendulous member 66 will swing downwardly, moving the latch member 68 and latch face 70 apart, the further downward movement of the pivot 56 and corresponding end of the arm 54 being accompanied by an upward movement of the latch face 70 away from the latch member 68, so that the members are no longer positioned for re-engagement. When the truck moves away the unsupported lip member will drop immediately to its pendant position, and the board can now be returned to the stored position, or alternatively it can be returned to the uppermost position of FIG. 6 ready for the receipt of another truck.

A rearward extension 72 of the arm 54 will operate as a safety device preventing a malfunction that may arise if an operator attempts to lift the lip manually while the ramp assembly is in its uppermost position. In these circumstances the pendulous member 66 will be swung forwardly and upwardly by the extension 72; without the extension the pendulous member would swing to its vertical position and, upon release of the lip by the operator and walking-down of the ramp assembly, the latch face end of arm 54 would become lodged under the pendulous member 66, causing a permanent malfunction.

In this particular embodiment the free ends of the pins 60 and 64 extend in cantilever manner from the bracket 6, but in other embodiments it may be preferred to provide brackets on both sides of the arm 54 and the member 66, so that the operative portions of the pins are more positively supported.

It will be understood by those skilled in the art that the successful operation of the disclosed mechanism depends upon the relative lengths of the arm 54 and member 66, the relative locations of the pins 60 and 64 and the pivot 56, and the relative shapes of the latch faces to obtain the necessary engagement between them over the angle through which the main plate moves from its designed uppermost to its designed lowermost position. The corresponding design parameters for each size of dockboard may be and have been resolved by a graphical trial and error method until a satisfactory solution has been reached. it will be seen that although the latch member 68 is specifically illustrated herein as being carried by a pendulous member 66, it is a fortunate additional feature of this invention that the required motion of the latch member 68 relative to the latch face 70 can be produced by such a simple and robust form of mounting. However, the exact mechanical equivalent could be obtained by mounting the member 68 for equivalent guided motion, for example by means of a cam slot in one of the brackets 62. Another way of obtaining the equivalent guided motion is by means of a non-linear slot 58 in the arm, which effects the required movement of the latch face 70; such solution may be preferred for example with a small dockboard where the space beneath the main plate is of limited depth. Again, the structure illustrated of a slotted arm 54 embracing a guiding pivoting-pin member could be replaced by a guide member pivoted to the frame assembly and embracing the arm 54 to permit the required longitudinal movement thereof.

The lip elevating mechanism of the invention is also applicable to the type of dockboard in which the elevating and lowering of the main plate is performed by one or more operator controlled hydraulic cylinders.

In this embodiment the arm latch member is disposed on the arm on the side thereof with respect to the guide means pivot pin opposite to the connection of the arm with the lip plate, but it could instead be disposed on the same side with the consequent necessary reversal of the direction of movement of the movable frame means latch member.

I claim:

1. A dockboard comprising frame means; a main plate having a front edge; means pivotally connecting the main plate with the said frame means for pivoting movement about a respective first pivot axis; a lip plate; means mounting the lip plate at the main plate front edge for movement relative to the main plate between a stored position and an operative extended position; and lip-extending means operative to move the lip plate from its stored position to its operative position upon downward movement of the main plate about the said first pivot axis; the lip-extending means comprising:

an arm operatively connected with the said lip plate and movable therewith;

guide means mounted to the frame means engaging the arm and guiding it for longitudinal movement and also permitting pivoting movement of the arm relative to the frame means;

and latch means comprising cooperating latch members on respectively the arm and the frame means and engagable with one another upon movement of the main plate to an upper position so that downward movement of the main plate from the upper position will cause the arm to extend the lip plate; the said first means latch member being movably mounted on the frame means for movement such as to maintain operative engagement of the latch during the downward movement of the main plate from said upper position and to permit disengagement of the latch at a lower position above where the extended lipplate can engage a truck in front of the dockboard.

2. A dockboard as claimed in claim 1, wherein the said arm latch member is provided on the arm on the side thereof with respect to the said guide means pivot opposite to the connection of the arm with the lip plate.

3. A dockboard as claimed in claim 1, wherein the said frame means latch member is mounted for pendulous movement and engages the arm latch member over an arc of its pendulous movement.

4. A dockboard as claimed in claim 3, wherein the said pendulous frame means latch member engages the arm latch member over an arc of its pendulous movement around and adjacent to bottom dead centre.

5. A dockboard as claimed in claim 1, wherein the said guide means comprise a pin member mounted from the frame means and engaged in a longitudinal slot in the arm to permit longitudinal movement of the arm by corresponding movement of the slot relative to the pin member, and also to permit pivoting of the arm about the pin member.

6. A dockboard as claimed in claim 1, wherein the said arm has a projection engaging the movable frame means latch member during upward movement of the main plate to prevent disengagement of the latch members from one another during such movement.

7. A dockboard as claimed in claim 1, wherein a stop member is provided engaging the frame means latch member during movement thereof when the main plate has descended below a dock level position to prevent further movement of that latch member and to positively disengage the latch members.

8. A dockboard as claimed in claim 1, and comprising spring means operatively connected between the frame means and the main plate and urging the main plate for upward movement, and operator-controlled restraining means operatively connected between the frame means and the main plate for restraining such upward movement.

9. A dockboard as claimed in claim 3, and comprising spring means operatively connected between the frame means and the main plate and urging the main plate for upward movement, and operator-controlled restraining means operatively connected between the frame means and the main plate for restraining such upward movement.

10. A dockboard as claimed in claim 4, and comprising spring means operatively connected between the frame means and the main plate and urging the main plate for upward movement, and operator-controlled restraining means operatively connected between the frame means and the main plate for restraining such upward movement.

11. A dockboard as claimed in claim 6, and comprising spring means operatively connected between the frame means and the main plate and urging the main plate for upward movement, and operator-controlled restraining means operatively connected between the frame means and the main plate for restraining such upward movement.

12. A dockboard as claimed in claim 7, and comprising spring means operatively connected between the frame means and the main plate and uring the main plate for upward movement, and operator-controlled restraining means operatively connected between the frame means and the main plate for restraining such upward movement.

13. A dockboard as claimed in claim 8, and comprising spring means operatively connected between the frame means and the main plate and urging the main plate for upward movement, and operator-controlled restraining means operatively connected between the frame means and the main plate for restraining such upward movement.

* * * * *